US008899484B2

(12) United States Patent
Trajkovic et al.

(10) Patent No.: US 8,899,484 B2
(45) Date of Patent: Dec. 2, 2014

(54) IMAGING READER AND METHOD WITH ENHANCED AIMING PATTERN DETECTION

(75) Inventors: Miroslav Trajkovic, Centereach, NY (US); Vladimir Gurevich, Stony Brook, NY (US); Heng Zhang, Selden, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1260 days.

(21) Appl. No.: 12/286,088

(22) Filed: Sep. 26, 2008

(65) Prior Publication Data

US 2010/0078481 A1   Apr. 1, 2010

(51) Int. Cl.
*G06K 7/10* (2006.01)
*G03B 7/08* (2014.01)
*G06K 9/24* (2006.01)
*G06K 7/14* (2006.01)

(52) U.S. Cl.
CPC .............. *G06K 7/10722* (2013.01); *G06K 7/14* (2013.01); *G06K 2207/1018* (2013.01); *G06K 2207/1011* (2013.01)
USPC ............ 235/462.21; 235/462.24; 235/462.42; 235/462.2; 235/462.01

(58) Field of Classification Search
USPC ............. 235/462.21, 462.24, 462.06, 462.08, 235/462.25, 462.32, 462.33, 462.41, 235/462.42, 462.2, 462.01
See application file for complete search history.

(56) References Cited

U.S. PATENT DOCUMENTS

| | | | | |
|---|---|---|---|---|
| 5,010,241 A | * | 4/1991 | Butterworth | 235/462.24 |
| 5,212,371 A | * | 5/1993 | Boles et al. | 235/462.39 |
| 5,250,791 A | * | 10/1993 | Heiman et al. | 235/462.21 |
| 5,410,141 A | * | 4/1995 | Koenck et al. | 235/472.02 |
| 5,581,071 A | * | 12/1996 | Chen et al. | 235/462.06 |
| 5,621,203 A | * | 4/1997 | Swartz et al. | 235/462.11 |
| 5,801,371 A | * | 9/1998 | Kahn et al. | 235/472.01 |
| 7,182,260 B2 | * | 2/2007 | Gurevich et al. | 235/462.08 |

(Continued)

FOREIGN PATENT DOCUMENTS

| | | |
|---|---|---|
| WO | 92/04514 | 4/1992 |
| WO | 99/64980 | 12/1999 |
| WO | 2009/095755 | 4/2009 |

OTHER PUBLICATIONS

International Search Report & Written Opinion dated Dec. 17, 2009 in related case PCT/US2009/056622.

(Continued)

*Primary Examiner* — Daniel Walsh
(74) *Attorney, Agent, or Firm* — Nong-Qiang Fan

(57) ABSTRACT

An image capture system for, and a method of, reading an optical code during a reading mode, comprise an aiming assembly including a laser for emitting a laser beam having a variable intensity, and for generating an aiming pattern from the laser beam during an aiming mode prior to the reading mode, and an imager for detecting and capturing an image of the aiming pattern and the code over a field of view by exposure over an exposure time period during the aiming mode, and for detecting and capturing an image of the code over the field of view during the reading mode. A controller is operative for controlling the intensity of the laser beam during the aiming mode by increasing the intensity of the laser beam during the exposure time period to enhance detection and capture of the aiming pattern by the imager, and by decreasing the intensity of the laser beam frame outside the exposure time period for user safety.

16 Claims, 4 Drawing Sheets

(56) References Cited

U.S. PATENT DOCUMENTS

| | | | |
|---|---|---|---|
| 7,347,371 B2* | 3/2008 | Joseph et al. | 235/462.23 |
| 7,478,753 B2* | 1/2009 | Patel et al. | 235/462.08 |
| 7,494,065 B2* | 2/2009 | Barkan et al. | 235/472.01 |
| 7,611,060 B2* | 11/2009 | Wang et al. | 235/462.23 |
| 2003/0178492 A1* | 9/2003 | Tamburrini et al. | 235/472.01 |
| 2003/0226895 A1* | 12/2003 | Havens et al. | 235/462.22 |
| 2004/0169084 A1* | 9/2004 | Tamburrini et al. | 235/462.38 |
| 2005/0001035 A1* | 1/2005 | Hawley et al. | 235/462.21 |
| 2005/0035205 A1* | 2/2005 | Li | 235/462.21 |
| 2005/0258252 A1* | 11/2005 | Winter et al. | 235/472.02 |
| 2005/0284942 A1* | 12/2005 | Gurevich et al. | 235/462.21 |
| 2006/0043187 A1* | 3/2006 | He et al. | 235/462.2 |
| 2006/0043191 A1* | 3/2006 | Patel et al. | 235/462.21 |
| 2006/0113389 A1* | 6/2006 | Barkan | 235/462.21 |
| 2006/0118635 A1* | 6/2006 | Joseph et al. | 235/462.24 |
| 2006/0202036 A1* | 9/2006 | Wang et al. | 235/462.07 |
| 2006/0202038 A1* | 9/2006 | Wang et al. | 235/462.24 |
| 2006/0255147 A1* | 11/2006 | Havens et al. | 235/462.21 |
| 2007/0034696 A1* | 2/2007 | Barkan et al. | 235/472.01 |
| 2007/0164115 A1* | 7/2007 | Joseph et al. | 235/462.21 |
| 2007/0176003 A1* | 8/2007 | Brock | 235/462.24 |
| 2007/0176004 A1* | 8/2007 | Walczyk et al. | 235/472.01 |
| 2007/0228176 A1* | 10/2007 | Vinogradov et al. | 235/462.46 |
| 2008/0292141 A1* | 11/2008 | Yu et al. | 382/106 |
| 2009/0001174 A1* | 1/2009 | Barkan et al. | 235/462.42 |
| 2009/0084851 A1* | 4/2009 | Vinogradov et al. | 235/462.21 |
| 2009/0218403 A1* | 9/2009 | Joseph et al. | 235/462.21 |
| 2010/0044440 A1* | 2/2010 | Wang et al. | 235/462.24 |
| 2010/0078481 A1* | 4/2010 | Trajkovic et al. | 235/462.41 |
| 2010/0090007 A1* | 4/2010 | Wang et al. | 235/462.11 |
| 2010/0102128 A1* | 4/2010 | Vinogradov et al. | 235/462.3 |
| 2010/0127078 A1* | 5/2010 | Brock et al. | 235/438 |

OTHER PUBLICATIONS

International Preliminary Report on Patentability dated Apr. 7, 2011 in related case PCT/US2009/056622.

* cited by examiner

IMAGING READER AND METHOD WITH ENHANCED AIMING PATTERN DETECTION

BACKGROUND OF THE INVENTION

This invention generally relates to an imaging reader for, and a method of, reading an optical code by visually positioning a laser-based aiming pattern relative to the code to be read during an aiming mode of operation and, more particularly, relates to enhancing detection of the aiming pattern during the aiming mode without violating human eye exposure laser safety limit standards and without reducing visibility of the aiming pattern to a user, especially in the presence of bright ambient light.

Imaging readers have been developed heretofore for reading optical codes, such as one- or two-dimensional bar code symbols, appearing on a label or on a surface of an article. The symbol itself is a coded pattern of graphic indicia comprised of, for example, a series of bars of various widths spaced apart from one another to bound spaces of various widths, where the bars and spaces have different light reflecting characteristics. The imaging readers electro-optically transform the graphic indicia into electrical signals, which are decoded into alphanumeric characters that are intended to be descriptive of the article or some characteristic thereof. Such characters are typically represented in digital form and utilized as an input to a data processing system for applications in point-of-sale processing, inventory control and the like.

Imaging readers are used in both fixed and portable installations in many diverse environments, such as in stores for check-out services, in manufacturing locations for work flow and inventory control, and in transport vehicles for tracking package handling. The readers can be used for rapid data entry or for self-configuration, such as by scanning a target bar code symbol from a printed listing of many bar code symbols. In some uses, the reader is connected to a portable data processing terminal or a data collection and transmission terminal. Frequently, the reader is handheld. Often, the reader is a single component of a much larger system or network including other readers, computers, cabling, data terminals, etc.

The imaging reader has an imager module, which includes an image sensor having a one- or two-dimensional, solid-state array of cells or photosensors, such as a charge coupled device (CCD), a complementary metal oxide semiconductor (CMOS) device, a charge modulated device (CMD), or a charge injection device (CID). The imager module images a target symbol by sensing return light reflected or scattered off the target symbol being imaged over an exposure time period, and by responsively generating a plurality of electrical signals corresponding to a one- or two-dimensional array of pixel information describing a field of view (FOV) of the imager module. The electrical signals are then processed and provided to decode circuitry for decoding thereof. The imager module typically includes a lens assembly for capturing and focusing the return light on the image sensor.

When multiple optical codes are in the FOV of the imager module, for example, in the case of a shipping label on which multiple bar code symbols are printed, a known reader of the prior art typically automatically determines which code is the easiest to capture and/or read, and that code is decoded first. A user of this known reader does not control which code the reader should try to decode and, accordingly, may have difficulty scanning a desired code.

To assist the user in scanning the desired code, imaging readers are often equipped with an aiming assembly having an aiming laser for generating a laser beam, and optics for generating a visible aiming pattern, such as a "crosshair" pattern, from the laser beam. The user trains the aiming pattern on the target symbol to be imaged during an aiming mode. In commercially available imaging readers, it is common for a center of the aiming pattern to not coincide with a center of the FOV of the imager module due to parallax and to mechanical or manufacturing inconsistencies, including the displacement between the laser of the aiming assembly and a focal point of the lens assembly for focusing light onto the image sensor. The user may use the aiming pattern to choose a desired code that is presented together with multiple optical codes, such as on a sheet or label having one or more columns of printed optical codes. The user may try to align the center of the aiming pattern to coincide with, or be nearest to, the desired code and then manually activate a reading mode, such as by pulling a trigger.

Upon activation of the reading mode, the reader temporarily disables generation of the aiming pattern so that the aiming pattern is not incorporated into the image being acquired in order not to obstruct the target code being imaged. The actual position of the aiming pattern in the acquired image is not necessarily in the center of the acquired image. In fact, the actual position of the aiming pattern is not known. The desired code is not necessarily the acquired code that is closest to the center of the acquired image. U.S. Patent Application Publication No. 2006/0043191 discloses a reliable way for the image sensor to determine which optical code of the multiple optical codes lying within the FOV of the imager module is the desired optical code. Thus, the image sensor captures an image of the aiming pattern and of the target code during the aiming mode in order to determine the desired optical code, and captures an image of just the desired optical code during the reading mode.

Nevertheless, as advantageous as these known imaging readers have been in targeting the desired optical code, there are situations when the aiming patterns cannot be readily detected by the image sensor during the aiming mode. In some applications, such as in well-lit indoor environments or outdoors in sunlight, the aiming patterns can be washed out by the brighter ambient light. If the image sensor cannot detect the aiming pattern during the aiming mode, then the desired optical code may not be detected and read.

Detectability of the aiming pattern in the image captured by the image sensor is proportional to the contrast of the aiming pattern compared to the rest of the captured image. Increasing the intensity of the aiming laser beam will increase the brightness or detectability of the aiming pattern. However, increasing the beam intensity may violate human eye exposure laser safety standard limits. For example, a class 2 laser is limited to an output power of 1 mW over a base time interval of 250 msec, and a class 1 laser is limited to an output power of 0.39 mW over a base time interval of 10 sec. The beam intensity cannot exceed these limits. Conversely, decreasing the beam intensity may result in the aiming pattern being undetectable by the image sensor and not visible to the user.

Accordingly, there is a need for a system for, and a method of, enhancing the detection of the aiming pattern in the image acquired by the sensor during the aiming mode, especially when a desired optical code is situated among multiple optical codes in the FOV of the imager module, particularly under bright ambient light conditions, without violating human eye exposure laser safety limit standards and without reducing visibility of the aiming pattern to a user.

SUMMARY OF THE INVENTION

One feature of this invention relates to a system for, and a method of, reading an optical code during a reading mode and, more particularly, to enhancing detection of an aiming pattern in an image acquired by a sensor during an aiming mode prior to the reading mode. The system comprises an aiming assembly including a laser for emitting a laser beam having a variable intensity, and optics for generating an aiming pattern from the laser beam during the aiming mode. The system also comprises an imager, preferably including an array of solid-state sensors, for detecting and capturing the image of the aiming pattern and the code over a field of view by exposure over an exposure time period during the aiming mode, and for detecting and capturing the image of the code over the field of view during the reading mode.

In accordance with this feature, a controller is operative for controlling the intensity of the laser beam during the aiming mode by increasing the intensity of the laser beam during the exposure time period to enhance detection and capture of the aiming pattern by the imager, and by decreasing the intensity of the laser beam outside the exposure time period. As discussed above, there are situations, such as in well-lit indoor environments or outdoors in sunlight, when a low contrast between the aiming pattern and the rest of the captured image results in the aiming pattern not being readily detected by the imager module. In some applications, the aiming pattern is washed out by the brighter ambient light. If the imager module cannot detect the aiming pattern, then the reader cannot select a desired optical code from among multiple codes that may be present in the field of view, for example, in the case of a shipping label that has multiple codes in the field of view, thereby resulting in the desired optical code not being read. Hence, by increasing the intensity of the laser beam, the brightness of the aiming pattern will increase, while the brightness of the rest of the image will remain the same and, as a result, the detection and capture of the aiming pattern by the imager are enhanced.

However, the intensity of the laser beam cannot be increased too much and/or for too long without violating human eye exposure laser safety limits. The laser typically has a generally constant output power safety level, which is limited and regulated depending on the class of the laser. For example, a class 2 laser is limited to a constant output power safety level of 1 mW over a base time interval, e.g., on the order of 250 ms, and a class 1 laser is limited to a constant output power safety level of 0.39 mW over a base time interval, e.g., on the order of 10 sec. Output powers greater than those prescribed over longer than the prescribed time intervals are considered to be dangerous to the eyes of the user and bystanders.

Hence, this invention proposes increasing the intensity of the laser beam only during a brief exposure time period during the aiming mode, and by decreasing the intensity of the laser beam outside the exposure time period. The exposure time period is a minor fraction of time compared to the duration of the aiming mode. The aiming laser is pulsed or energized only during the exposure time period. Decreasing the duration of the exposure time period will decrease the brightness of both the aiming pattern and that of the rest of the image by approximately the same factor. However, by simultaneously increasing the intensity of the laser beam and by decreasing the duration of the exposure time period, the brightness of the rest of the image will decrease more than that of the aiming pattern and, therefore, the contrast of the aiming pattern in the acquired image will improve, resulting in better detection of the aiming pattern. At the same time, the average intensity of the laser beam during the aiming mode is sufficient to render the aiming pattern visible to the user.

In accordance with another feature, the aiming controller controls the aiming laser to generate the laser beam as a plurality of pulses each having a high output power level or peak for brief pulse time durations less than the duration of the aiming mode, and having a low output power level during the remainder of the aiming mode, The fewer the number of peaks, and the shorter the time duration of each pulse, the higher the peak output power of each pulse can be. For example, for a class 2 laser with a 250 ms base time, detection of the aiming pattern will be enhanced by choosing each pulse with a pulse duration of 1 ms with a peak output power of 4 mW followed by an output power of 0.98 mW during the remaining 249 ms. Therefore, the detection of the aiming pattern in the acquired image, compared to the safety level of a constant output power of 1 mW, will increase by four times without decreasing the visibility of the aiming pattern to the user's eyes and without exceeding the laser safety limits.

In accordance with another embodiment, the aiming controller controls the laser to generate the laser beam during the aiming mode to alternate between a generally constant output power level and a plurality of pulses at a frequency, e.g., 1-30 Hz, visible to a human eye.

In accordance with another feature of this invention, the method of reading an optical code during a reading mode is performed by generating an aiming pattern from a laser beam having a variable intensity during an aiming mode prior to the reading mode, detecting and capturing an image of the aiming pattern and the code over a field of view by exposure of an imager over an exposure time period during the aiming mode, detecting and capturing an image of the code over the field of view during the reading mode, and controlling the intensity of the laser beam during the aiming mode by increasing the intensity of the laser beam during the exposure time period to enhance detection and capture of the aiming pattern by the imager, and by decreasing the intensity of the laser beam frame outside the exposure time period for user safety.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
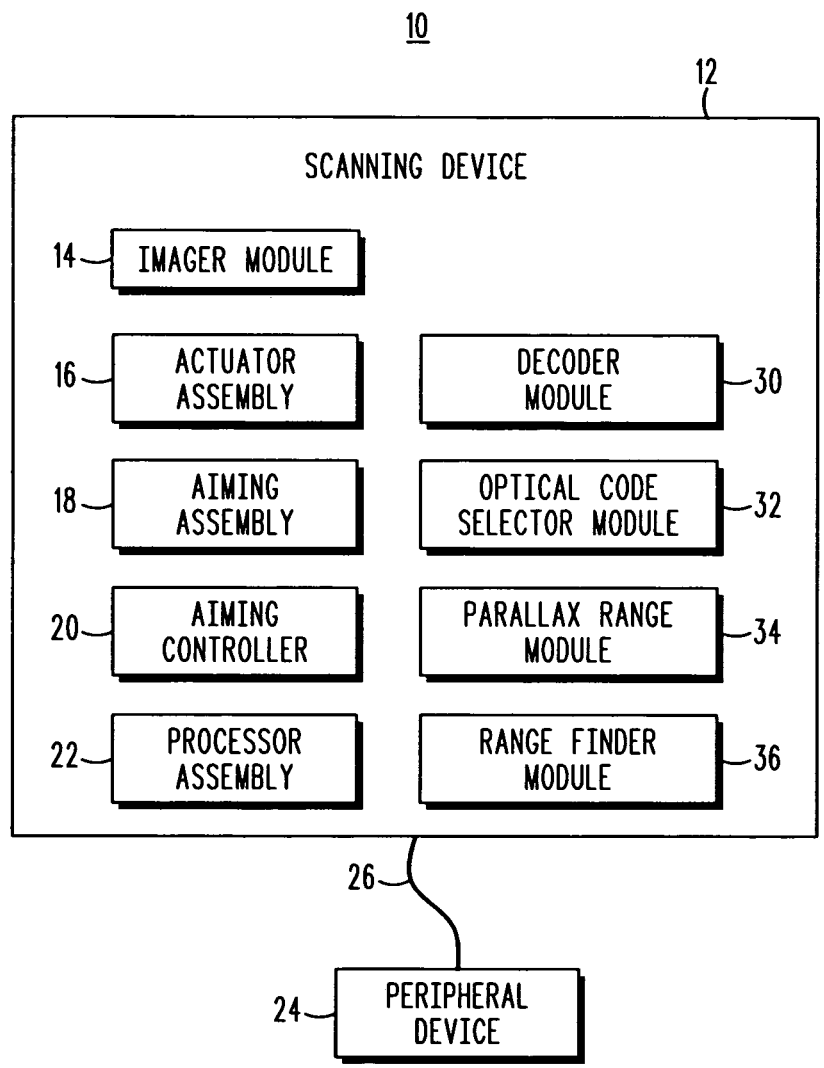
FIG. 1 is a block diagram of an optical scanner system in accordance with the present invention.

In FIG. 1, an optical code scanner system 10 for reading an optical code during a reading mode is shown, where the system 10 includes an imaging reader or scanning device 12 for reading an optical code, which may be, for example, a bar code symbol, a UPC/EAN symbol, a one-dimensional or multi-dimensional symbol, a textual code, etc. A "read" or "read operation" refers to imaging and decoding the optical code, but may further be understood as imaging and processing the optical code, such as for performing character recognition on the imaged optical code, transmitting or further processing the imaged optical code.

The scanning device 12 includes an imager module 14, an actuator assembly 16, an aiming assembly 18, an aiming controller 20, and a processor assembly 22. The scanning device 12 may be in communication with one or more peripheral devices 24, such as a keyboard, a display, a printer, a data storage medium, e.g., including storage for application software and/or databases, at least one remote processing device, e.g., a host processor, and/or another system or a network.

Executable by the processor assembly 20 are a decoder module 30, an optical code selector module 32, a parallax range module 34, and a range finder module 36. The optical code selector module 32 selects an optical code from one or more imaged optical codes and provides the selected optical code to the decoder module 30 for decoding thereof and/or for other further processing. Selection of the optical code is made in accordance with the location of the optical code relative to an aiming pattern generated by the aiming assembly 18 during an aiming mode, as described further below.

The scanning device 12 may be configured either as a handheld or portable device, or as a stationary device provided in a fixed location, such as a rotating turret. Furthermore, the scanning device 12 may be incorporated into a system, such as a local area, cellular or wide area, network or a video phone system. Additionally, the scanning device 12 may further be incorporated into another device, such as a personal digital assistant (PDA) or cellular phone.

A coupling 26 is provided for connecting the scanning device 12 to tile peripheral device 24. Coupling 26 may include wired or wireless couplings, such as a flexible electrical cable; a radio frequency, optical and/or cellular communication telephone exchange network, either through a modem or an ISDN interface; an infrared data interface (IRDA); a multi-contact shoe; or a docking device. Data transmitted by the coupling 26 may include compressed data.

The peripheral device 24 preferably includes a host processor having at least one data processor, which may be connected to one or more peripherals or computing devices, such as a video monitor and/or a network. Analog and/or digital devices may be provided in the host processor and/or the scanning device 12 for processing signals corresponding to sensing of light reflected or scattered from a target being imaged or scanned by the scanning device 12. The decoder module 30 may be provided in the peripheral device 24, such as the host processor and/or in the scanning device 12.

Figure 3:
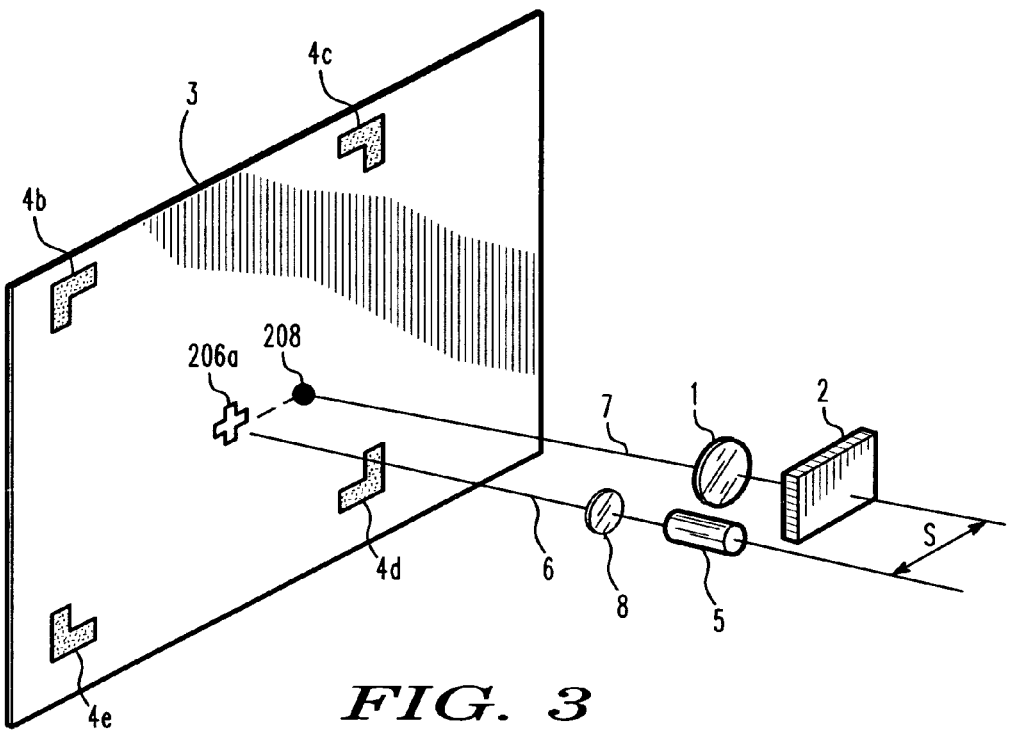
FIG. 3 is a perspective view of components of the optical scanner system depicting the generation of the aiming pattern.

The imager module 14 constantly acquires an image corresponding to a field of view (FOV) of the imager module 14, and provides corresponding image data as a series of frames to the processor assembly 22. Included with the imager module 14 is a solid-state photosensor array 2 (see FIG. 3) for sensing return light reflected or scattered from a target lying within the FOV of the imager module 14, and generating an array of electrical signals representing an image that corresponds to the sensing. An optical lens assembly 1 (see FIG. 3) is provided for capturing and focusing the sensed light onto the array. The photosensor array may be a charge coupled device (CCD), a complementary metal oxide semiconductor (CMOS) device, a charge modulated device (CMD), or a charge injection device (CID). The imager module 14 may further include circuitry, such as video circuitry, signal processing circuitry, etc., (not shown) for processing (e.g., filtering, buffering, amplifying, digitizing, etc.) the electrical signals for generating image data and interfacing with the processor assembly 22. Tile processed electrical signals are output periodically (synchronously or asynchronously) as a frame of image data including an array of pixels that correspond to the electrical signals. Accordingly, the imager module 14 outputs a series of frames of image data that correspond to the continual sensing by the photosensor array. The series of frames are provided to the processor assembly 22, where the frames of image data may be immediately processed and/or stored in order to be available for future processing.

The actuator assembly 16 includes an actuator, such as a trigger or switch (hardware or software), which may be activated by a user, a sensor, a processor, a host processor, etc., for generating an actuation signal upon activation thereof in order to initiate a read operation. The actuation signal may be generated by the host processor and received by the scanning device 12, such as in the form of a command.

The aiming assembly 18 includes at least one light source, such as a laser light source 5 (see FIG. 3), for generating a laser beam, and an optical element 8 (see FIG. 3), for forming an aiming pattern, including a crosshair 4*a* (see FIG. 3), which is projected in an area that corresponds to the FOV of the imager module 14 during the aiming mode. The user may aim the scanning device 12 (which may include positioning the target optical code) so that the aiming pattern is situated to coincide with, or be close to, the target optical code to be imaged. The user aims the scanning device 12 at the target optical code, and then actuates the actuator assembly 16 for initiating the reading mode of operation. The user aims the scanning device by situating the aiming pattern to coincide with, or be close to, the target optical code. U.S. Pat. No. 5,801,371 describes the operation of a scanning device, including generation of an aiming pattern and aiming the scanning device using the aiming pattern, and is incorporated by reference herein in its entirety.

The aiming controller 20 includes circuitry and/or software instructions executable by the processor assembly 22 and/or a data processor of the at least one peripheral device 24 for controlling enablement of the aiming assembly 18 for controlling generation of the aiming pattern during acquisition of at least one frame in response to receipt of the actuation signal. The circuitry may include digital, logic and/or analog devices. The aiming controller 20 may control the aiming assembly 18 so that a frame of image data that was captured while the user was aimed at the target optical code while the aiming pattern was visible during the aiming mode, as well as a frame of image data that was captured while the user was aimed at the target optical code while the aiming pattern was not visible during the reading mode.

The processor assembly 22 may include a microprocessor (s), a field programmable gate array (FPGA) and/or other processing device(s), and may further include at least one storage component, such as a flash memory device and/or a DRAM memory device. Further, the processor assembly 22 may communicate with the at least one peripheral device 24, such as the host processor. The processor assembly 22, or portions thereof, may alternatively be provided externally from the imager module 14, such as on another circuit board separate from that which the imager module 14 is provided on, and/or in the host processor. The processor assembly 22 receives the actuation signal when a read operation is initiated, and receives or retrieves respective frames of data of the series of frames upon receipt of the actuation signal for processing thereof.

The decoder module 30, the optical code selector module 32, the parallax range module 34, at least portions of the aiming controller 20, and the range finder module 36 include a series of programmable instructions executable by the processor assembly 22 and/or another processor external to the scanning device 12, such as the host processor. The series of programmable instructions can be stored on a computer-readable medium, such as RAM, a hard drive, CD, smart card, 3.5" diskette, etc., or transmitted via propagated signals for being executed by the processor assembly 22 for performing the functions disclosed herein. The processor assembly 22 is not limited to the software modules described. The functions of the respective software modules may be combined into one module or distributed among a different combination of modules.

The decoder module 30 receives signals indicative of optical codes or portions thereof and performs a decode operation on the respective codes and outputs a corresponding decoded code. It is contemplated that when receiving signals indicative of a partial code, the decoder module 30 may retrieve another portion of the code as needed for decoding thereof. The decode operation may include decoding a bar code symbol or other type of symbol, such as a text code including alphanumeric characters. The decoding process may include character recognition processing.

Figure 2A:
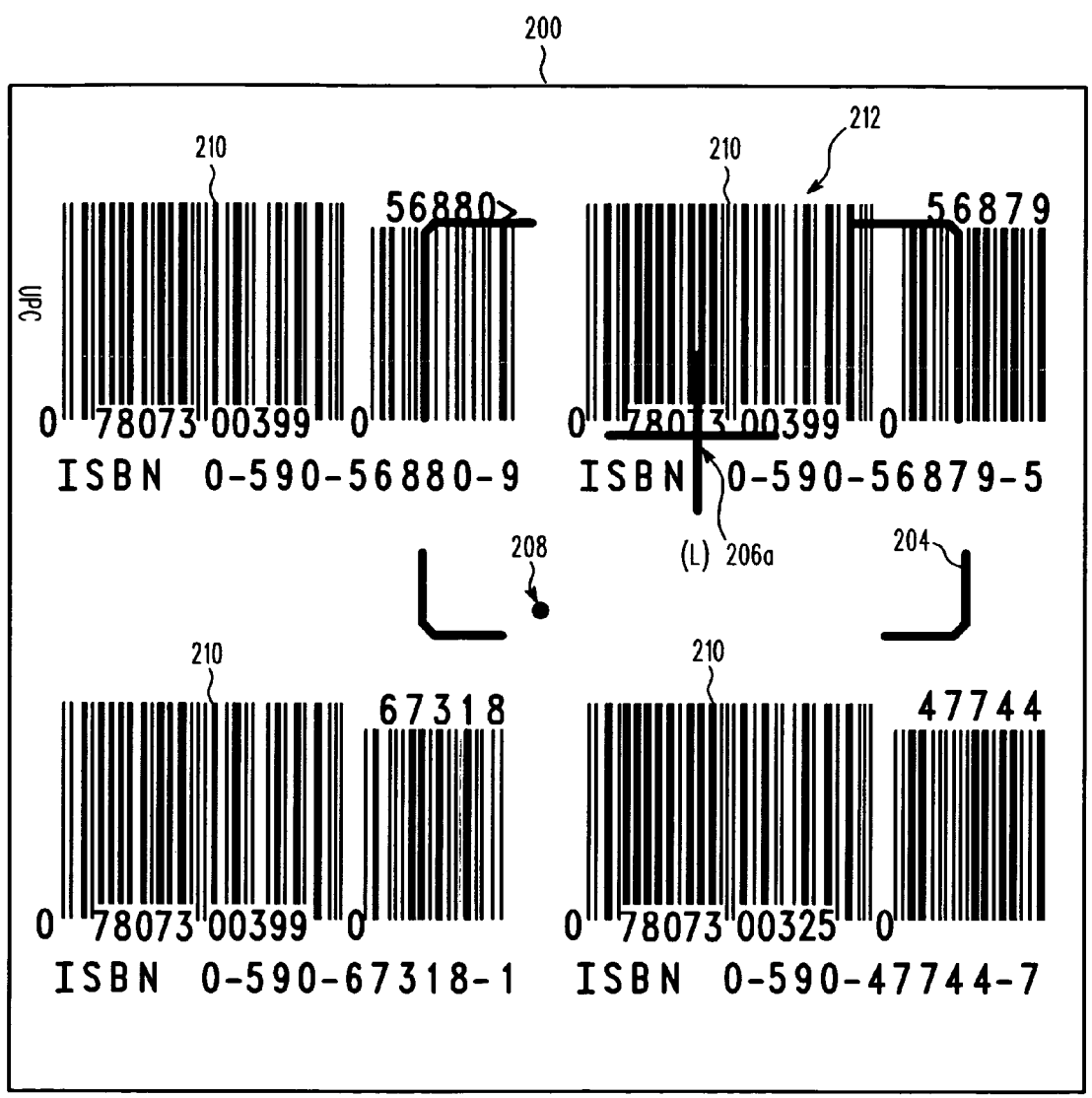
FIG. 2A is a diagram of an exemplary first frame of image data imaged in which an aiming pattern is generated.
Figure 2B:
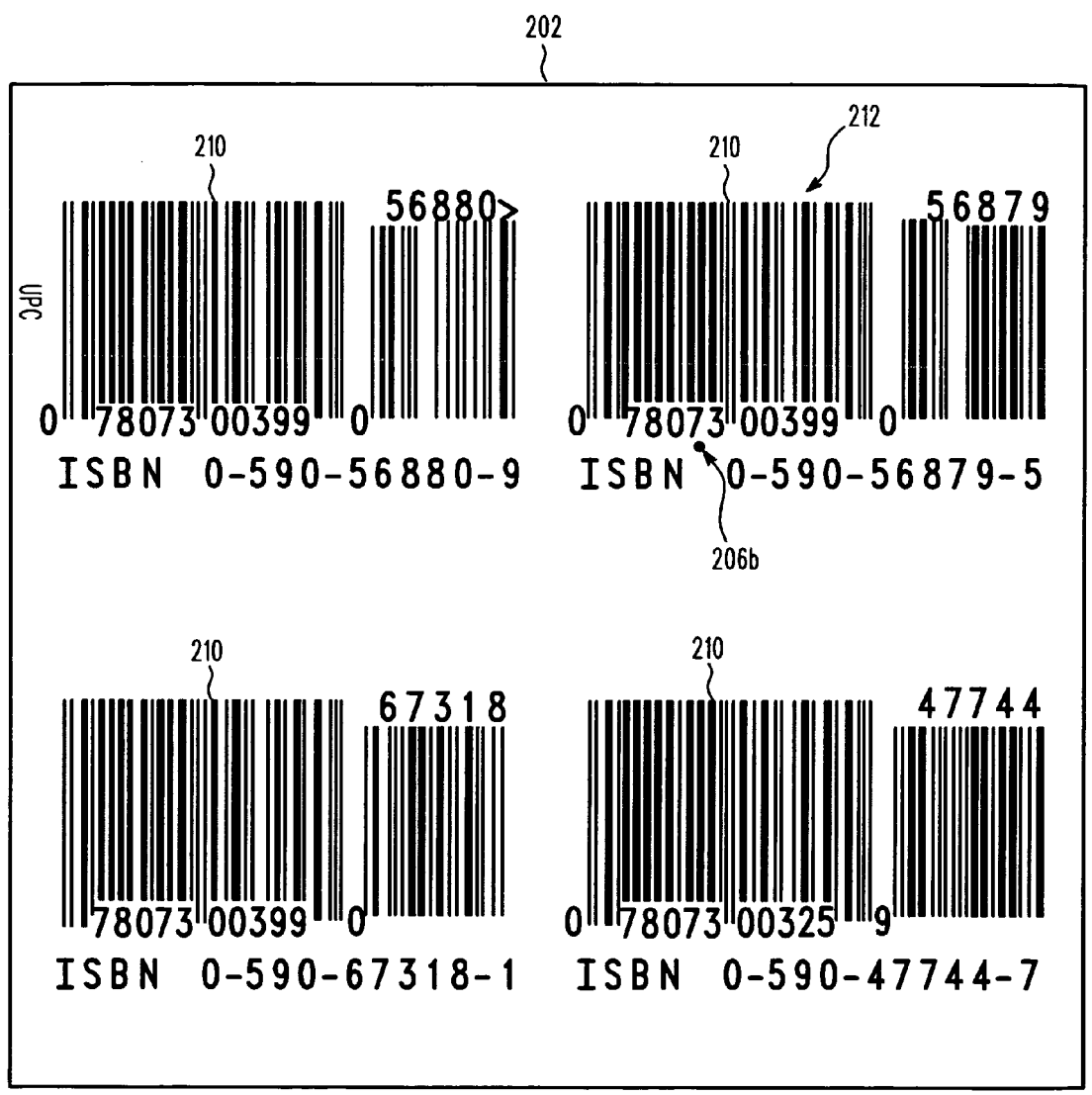
FIG. 2B is a diagram of an exemplary second frame of image data imaged in which an aiming pattern is not generated.

The optical code selector module 32, in response to receipt of the actuation signal, processes at least a portion of at least a first and a second frame of image data. Exemplary first and second frames 200 and 202 are shown in FIGS. 2A and 2B, respectively. During the aiming mode, the user aims the aiming pattern 204 at the target optical code 212. The first frame of image data 200 is acquired while the aiming pattern 204 is generated and visible, so that the aiming pattern 204 was captured during acquisition of the first frame of image data. In the example shown, several optical codes 210 are in the FOV and are acquired, but optical code 212 is the optical code that the user wants decoded.

A determination is made of the location L of at least one pixel 206a of the array of pixels of the first frame that corresponds to the aiming pattern 204, e.g., the center of the aiming pattern 204. The pixel that corresponds to the center of the array of pixels associated with the FOV of the imager module 14 is shown as point 208. In the exemplary image acquisition, the pixel 206a at the center of the aiming pattern 204 does not coincide with the pixel located at point 208. In commercially available scanning devices, it is common for the center of the aiming pattern to not coincide with the center of the FOV of the imager module 14 due to parallax and mechanical or manufacturing inconsistencies, such as manufacturing process variations and mechanical tolerances.

FIG. 2B shows a second frame of image data 202 acquired during the reading mode while the aiming pattern is not generated and is not visible. As the user aims the scanning device and pulls the trigger, frames 200 and 202 are acquired in rapid sequence, preferably with frame 200 acquired immediately prior to frame 202, but not limited thereto. For image acquisition having a conventional rate of 30 frames/sec, frames 200 and 202 may be acquired approximately 33 msec apart from each other. Due to the rapid successive acquisitions of frames 200 and 202 as the user aims the scanning device 12, the FOV captured for frames 200 and 202 is substantially the same.

The aiming pattern 204 was not captured during acquisition of the second frame of image data 202, but the location of the aiming pattern, specifically the center of the aiming pattern can be determined based on the location L of pixel 206a in the first frame 200. The pixel 206b of the array of pixels of frame 202 is determined which is located at location L, i.e., the location of pixel 206a as determined from the first frame 200. The target optical code 212 is selected from the other optical codes 210, where optical code 210 that is located nearest to pixel 206b. Optical code 212 is provided to the decoder module 30 for decoding thereof. Alternatively, optical codes, or portions thereof, that were found within a vicinity of (e.g., within a predetermined distance from) pixel 206b are further processed, such as for decoding thereof. Where a portion of an optical code lies within the vicinity of pixel 206b, the portion may be processed and/or remaining portions of the optical code may be processed, which may depend, for example, upon how significant a portion of the optical code was located within the vicinity.

When the aiming pattern is generated and visible, the user may use the aiming pattern to aim the scanning device so that the aiming pattern may be trained to coincide with, or be near, a target optical code. The user of the scanning device 12 aims the scanning device 12 at the target optical code and activates the actuator assembly 16. As the actuator assembly 16 is activated, the imager module 14 is acquiring a series of frames. Image data of frame 200 is acquired with the aiming pattern generated, so that the aiming pattern is acquired in the image data. At least a portion of the acquired image data of frame 200 is processed by the optical code selector module 32 for determining the location L of the pixel 206a that corresponds to the center of the aiming pattern. The location L may be described by coordinates, e.g., (x, y).

During frame 202, the generation of the aiming pattern is disabled. Image data is acquired with the aiming pattern disabled (not generated), so that the aiming pattern is not acquired in the image data. At least a portion of the image data of frame 202 is processed by the optical code selector module 32 for determining and selecting the optical code 212 located closest to a pixel 206b located at location L. Alternatively, optical codes are selected when the respective optical codes or a portion thereof, are found within a vicinity of (e.g., within a predetermined distance from) pixel 206b. The selected optical code(s) or portions thereof (e.g., optical code 212) are processed, e.g., decoded by the decoder module 30. The processed, e.g., decoded, code is transmitted, such as to the at least one peripheral device 24, e.g., the host processor and/or a display device.

As described above, FIG. 3 shows that the imager module 14 comprises the imaging lens 1 having an imaging axis 7 and operative for imaging a target 3 on the image sensor 2. The aiming assembly 18 comprises the laser 5 for emitting a laser beam and the optical element 8 having an aiming light axis 6, which creates an aiming pattern from the laser beam on the target 3 consisting of a central crosshair centered on the point 206a and framing lines 4b-4e showing approximately the corners of the field of view of the imager or sensor 2. The imaging axis 7 intersects the target 3 at the point 208. There is a parallax "S" between axes 6 and 7. The optical element 8 is preferably an interferometric optical element, such as a diffractive element, a holographic element, or a Fresnel element, or a non-interferometric optical element, such as a lens, or a refractive element having a plurality of refractive structures.

In accordance with one feature of this invention, the aiming controller 20 is operative for controlling the intensity of the laser beam during the aiming mode (frame 200) by increasing the intensity of the laser beam to a generally constant high output power level "P2" (see FIG. 5) during an exposure time period "t" (see FIG. 5) of the image sensor 2 to enhance detection and capture of the aiming pattern by the imager 2, and by decreasing the intensity of the laser beam to a generally constant low output power level "P3" (see FIG. 5) outside the exposure time period. There are situations, such as in well-lit indoor environments or outdoors in sunlight, when a low contrast between the aiming pattern and the rest of the captured image results in the aiming pattern not being readily detected by the imager 2. In some applications, the aiming pattern is washed out by the brighter ambient light. If the imager 2 cannot detect the aiming pattern, then the reader cannot select a desired optical code from among multiple codes that may be present in the field of view, for example, in the case of a shipping label that has multiple codes in the field of view, thereby resulting in the desired optical code not being read. Hence, by increasing the intensity of the laser beam to "P2", the brightness of the aiming pattern will increase, while the brightness of the rest of the image will remain the same and, as a result, the detection and capture of the aiming pattern by the imager 2 are enhanced.

Figure 4:
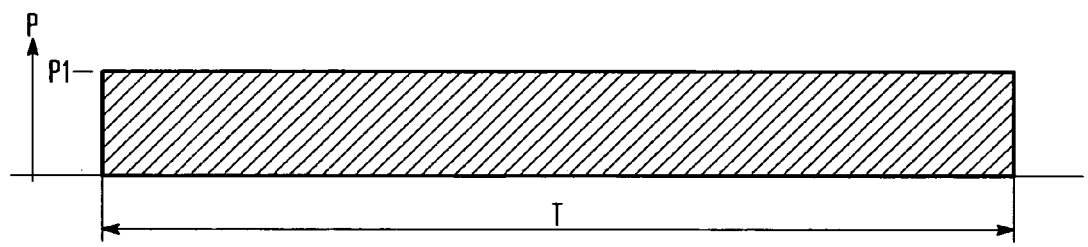
FIG. 4 is a graph depicting operation of the aiming pattern in accordance with the prior art.

However, the intensity of the laser beam cannot be increased too much and/or for too long without violating human eye exposure laser safety limits. The laser 5 typically has a generally constant output power level "P1" (see FIG. 4), which is limited and regulated depending on the class of the laser. For example, a class 2 laser is limited to a constant output power level of 1 mW over a base time interval "T" (see FIG. 4), e.g., on the order of 250 ms, and a class 1 laser is limited to a constant output power level of 0.39 mW over a base time interval, e.g., on the order of 10 sec. Output powers greater than those prescribed over longer than the prescribed time intervals are considered to be dangerous to the eyes of the user and bystanders.

Hence, this invention proposes increasing the intensity of the laser beam to the high power level "P2", which is greater than the level "P1", only during a brief exposure time period "t" during the aiming mode (frame 200), and by decreasing the intensity of the laser beam to the low power level "P3", which is less than the level "P1", for example, about 98% of "P1" outside the exposure time period, that is, at all other times during the remainder of the aiming mode. The exposure time period "t" is a minor fraction of time compared to the duration of the aiming mode and of the base time. The aiming laser 5 is pulsed or energized only during the exposure time period. Decreasing the duration of the exposure time period will decrease the brightness of both the aiming pattern and that of the rest of the image by approximately the same factor. However, by simultaneously increasing the intensity of the laser beam and by decreasing the duration of the exposure time period, the brightness of the rest of the image will decrease more than that of the aiming pattern and, therefore, the contrast of the aiming pattern in the acquired image will improve, resulting in better detection of the aiming pattern. At the same time, the average intensity of the laser beam during the aiming mode is sufficient to render the aiming pattern visible to the user. The total emitted energy under the graph in FIG. 5 is about the same as in FIG. 4.

In accordance with another feature, the aiming controller 20 controls the aiming laser 5 to generate the laser beam as a plurality of pulses (1, 2, . . . n) each having the high output power level "P2" or peak for brief pulse time durations less than the duration of the aiming mode, and having the low output power level "P3" during the remainder of the aiming mode. The fewer the number of peaks, and the shorter the time duration of each pulse, the higher the peak output power of each pulse can be. For example, for a class 2 laser with a 250 ms base time, detection of the aiming pattern will be enhanced by choosing each pulse with a pulse duration of 1 ms with a peak output power of 4 mW followed by an output power of 0.98 mW during the remaining 249 ms. Therefore, the detection of the aiming pattern in the acquired image, compared to the level "P1" of a constant output power of 1 mW, will increase by four times without decreasing the visibility of the aiming pattern to the user's eyes and without exceeding the laser safety limits.

Figure 5:
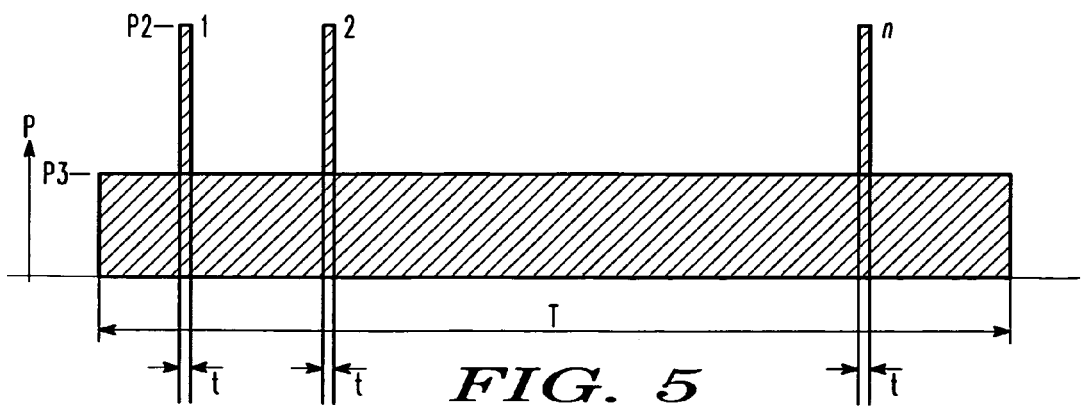
FIG. 5 is a graph depicting operation of the aiming pattern in accordance with the present invention.

In accordance with another embodiment, the aiming controller 20 controls the laser 5 to generate the laser beam during the aiming mode to alternate between the generally constant output power level "P1" and the plurality of pulses depicted in FIG. 5 at a frequency, e.g., 1-30 Hz, visible to a human eye.

It is contemplated that the target being imaged may not be an optical code, but may be a non-code entity positioned near other entities that may be in the field of view. The described enhanced detectability aiming pattern helps to select the desired entity from the others for further processing thereof, which may be other than decoding, such as transmission, character recognition, image processing, etc.

It will be understood that each of the elements described above, or two or more together, also may find a useful application in other types of constructions differing from the types described above.

While the invention has been illustrated and described as embodied in an imaging system and method with enhanced aiming pattern detection, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An image capture system for reading an optical code during a reading mode, comprising:
   an aiming assembly including a laser operative to emit a laser beam having a variable intensity, and operative to generate an aiming pattern from the laser beam during an aiming mode prior to the reading mode;
   an imager operative to detect and capture an image of the aiming pattern and the code over a field of view by exposure over an exposure time period during the aiming mode, and operative to detect and capture an image of the code over the field of view during the reading mode; and
   a controller operative to control the intensity of the laser beam during the aiming mode by having an increased intensity of the laser beam during the exposure time period of the aiming mode to enhance detection and capture of the aiming pattern by the imager, and by having a decreased average intensity of the laser beam during the aiming mode while outside the exposure time period of the aiming mode for user safety, wherein the intensity of the laser beam during the exposure time period of the aiming mode is higher than the average intensity of the laser beam during the aiming mode while outside the exposure time period of the aiming mode with said average intensity of the laser beam being larger than zero, and the intensity of the laser beam during the exposure time period of the aiming mode is higher than the intensity of the laser beam during the exposure time period of the reading mode.

2. The system of claim 1, wherein the imager has an array of solid-state sensors.

3. The system of claim 1, wherein the aiming assembly includes an optical element operative to generate the aiming pattern from the laser beam.

4. The system of claim 1, wherein the controller controls the laser to generate the laser beam as a plurality of signals each having an increased output power level during the exposure time period, and an decreased output power level outside the exposure time period.

5. The system of claim 4, wherein the controller controls the laser to generate the laser beam with a generally constant output power level alternating with the plurality of signals at a frequency visible to a human eye.

6. The system of claim 5, wherein the frequency of the plurality of pulses is between 1 and 30 Hz.

7. An image capture system for reading an optical code during a reading mode, comprising:
    aiming means for emitting a laser beam having a variable intensity, and for generating an aiming pattern from the laser beam during an aiming mode prior to the reading mode;
    imaging means for detecting and capturing an image of the aiming pattern and the code over a field of view by exposure over an exposure time period during the aiming mode, and for detecting and capturing an image of the code over the field of view during the reading mode; and
    control means for controlling the intensity of the laser beam during the aiming mode by increasing the intensity of the laser beam during the exposure time period of the aiming mode to enhance detection and capture of the aiming pattern by the imaging means, and by decreasing the intensity of the laser beam during the aiming mode while outside the exposure time period of the aiming mode for user safety, wherein the intensity of the laser beam during the exposure time period of the aiming mode is higher than the average intensity of the laser beam during the aiming mode while outside the exposure time period of the aiming mode with said average intensity of the laser beam being larger than zero, and the intensity of the laser beam during the exposure time period of the aiming mode is higher than the intensity of the laser beam during the exposure time period of the reading mode.

8. The system of claim 7, wherein the control means controls the laser to generate the laser beam as a plurality of signals each having an increased output power level during the exposure time period, and an decreased output power level outside the exposure time period.

9. The system of claim 8, wherein the control means controls the laser to generate the laser beam with a generally constant output power level alternating with the plurality of signals at a frequency visible to a human eye.

10. The system of claim 9, wherein the frequency of the plurality of pulses is between 1 and 30 Hz.

11. A method of reading an optical code during a reading mode, comprising the steps of:
    generating an aiming pattern from a laser beam having a variable intensity during an aiming mode prior to the reading mode;
    detecting and capturing an image of the aiming pattern and the code over a field of view by exposure of an imager over an exposure time period during the aiming mode, and detecting and capturing an image of the code over the field of view during the reading mode; and
    controlling the intensity of the laser beam during the aiming mode by increasing the intensity of the laser beam during the exposure time period of the aiming mode to enhance detection and capture of the aiming pattern by the imager, and by decreasing the intensity of the laser beam during the aiming mode while outside the exposure time period of the aiming mode for user safety, wherein the intensity of the laser beam during the exposure time period of the aiming mode is higher than the average intensity of the laser beam during the aiming mode while outside the exposure time period of the aiming mode with said average intensity of the laser beam being larger than zero, and the intensity of the laser beam during the exposure time period of the aiming mode is higher than the intensity of the laser beam during the exposure time period of the reading mode.

12. The method of claim 11, wherein the capturing step is performed by an array of solid-state sensors.

13. The method of claim 11, wherein the generating step is performed by a laser operative for generating the laser beam, and by an optical element for generating the aiming pattern from the laser beam.

14. The method of claim 13, wherein the controlling step is performed by controlling the laser to generate the laser beam as a plurality of signals each having an increased output power level during the exposure time period, and an decreased output power level outside the exposure time period.

15. The method of claim 14, wherein the controlling step is performed by controlling the laser to generate the laser beam with a generally constant output power level alternating with the plurality of signals at a frequency visible to a human eye.

16. The method of claim 15, and configuring the frequency of the plurality of pulses to be between 1 and 30 Hz.

* * * * *